United States Patent [19]

Abe et al.

[11] 4,428,074

[45] Jan. 24, 1984

[54] HIGH-SPEED SEARCH SYSTEM IN A ROTARY RECORDING MEDIUM REPRODUCING APPARATUS

[75] Inventors: Ryozo Abe; Masaki Sakurai, both of Yokohama; Hiroyuki Sugiyama, Isehara; Yasuhiro Yusa, Fujisawa; Kenji Yoshihara, Chiba, all of Japan

[73] Assignee: Victor Company of Japan, Ltd., Yokohama, Japan

[21] Appl. No.: 301,307

[22] Filed: Sep. 11, 1981

[30] Foreign Application Priority Data

Sep. 12, 1980 [JP] Japan ................................. 55-126886

[51] Int. Cl.³ ............................................. G11B 21/02
[52] U.S. Cl. ...................................... 369/32; 365/234; 360/72.2; 369/111
[58] Field of Search ..................... 360/72.2, 78, 75, 73; 358/907, 342; 369/30, 32, 33, 43, 111, 215, 220; 365/234

[56] References Cited

U.S. PATENT DOCUMENTS

| 4,106,058 | 8/1978 | Romeas | 369/32 |
| 4,321,635 | 3/1982 | Tsuyuguchi | 369/32 |

OTHER PUBLICATIONS

"A Random Access System Adapted for the Optical Videodisc", by Mathieu, SMPTE Journal, Feb. 1977, vol. 86, pp. 80–83.
"A Review of the MCA Disco-Vision System", by Broadbent, Jul. 1974, Journal of the SMPTE, vol. 83, pp. 554–559.

*Primary Examiner*—Alan Faber
*Attorney, Agent, or Firm*—Louis Bernat

[57] ABSTRACT

A high-speed search system in a rotary recording medium reproducing apparatus having a reproducing transducer including a reproducing element for reproducing recorded signals from a rotary recording medium in which an information signal and a chapter address signal including a program number of the information signal are recorded, and transferring mechanism for transferring the reproducing transducer along the radial direction of the rotary recording medium, comprises a designating circuit for designating a program number of a desired program which is to be reproduced, a reproducing circuit for reproducing a chapter address signal from a signal reproduced by the reproducing transducer; and a control circuit for comparing the designated program number with a program number of the reproduced chapter address signal and transferring the reproducing transducer at a high speed by the transferring mechanism towards a direction where the two program numbers coincide when the two program numbers differ, and controlling so that the reproducing transducer is transferred towards the direction where the two program numbers coincide according to the difference in the position of the reproducing element and a predetermined position within a program of the designated program number.

4 Claims, 7 Drawing Figures

4,428,074

HIGH-SPEED SEARCH SYSTEM IN A ROTARY RECORDING MEDIUM REPRODUCING APPARATUS

BACKGROUND OF THE INVENTION

The present invention generally relates to highspeed search system in rotary recording medium reproducing apparatuses, and more particularly to a high-speed search system in an apparatus which reproduces a rotary recording medium recorded with a chapter address signal having a program number for every program unit of a recorded information signal, which is capable of searching for and obtaining a desired position within a predetermined program within a short period of time with high accuracy.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals in such that the second and first reference signals are respecively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking control signal from the reproduced first and second reference signals.

Since no grooves are provided in the above disc, the reproducing stylus can be transferred from one track to another without damaging the reproducing stylus or the disc. Accordingly, in addition to the special reproduction such as still reproduction, slow-motion reproduction, and quick-motion reproduction, the system is capable of performing a so-called random access high-speed search in which the reproducing stylus is transferred to a desired position at high speed to reproduce the desired information.

Conventionally, in order to perform the above high-speed search and the like, address signals were continuously recorded in a recording region of the disc from the outermost periphery to the innermost periphery of the disc. Howeveer, by providing these address signals, there was a disadvantage in that the number of bits required became large. Accordingly, in order to eliminate this disadvantage, a system was considered in which a chapter address is used. This chapter address includes a program address indicating a program number for every program unit of the information signal, and a local address indicating a position within each program. By use of this system, the number of bits required can be reduced.

On the other hand, it is essential that the high-speed search is performed quickly and accurately. Hence, the present invention was devised in order to satisfy the above described demands in a disc which is recorded with the above chapter address signal.

SUMMARY OF THE INVENTION

Accordingly, it is a general object of the present invention to provide a novel and useful high-speed search system in a rotary recording medium reproducing apparatus, capable of quickly searching for a desired position within a rotary recording medium recorded with a chapter address signal.

Another and more specific object of the present invention is to provide a high-speed search system capable of quickly searching for a desired position at a high-speed within a short period of time, by transferring a reproducing transducer at a high speed up to a position having a desired program number, to transfer the reproducing transducer at an intermediate speed or to transfer the reproducing transducer in a skipping manner up to a desired position within that program, and transferring the reproducing transducer in a reverse direction when the reproducing transducer overruns the desired position.

Other objects and further features of the present invention will be apparent from the following detailed description when read in conjunction with the accompanying drawings.

DETAILED DESCRIPTION

Figure 1:
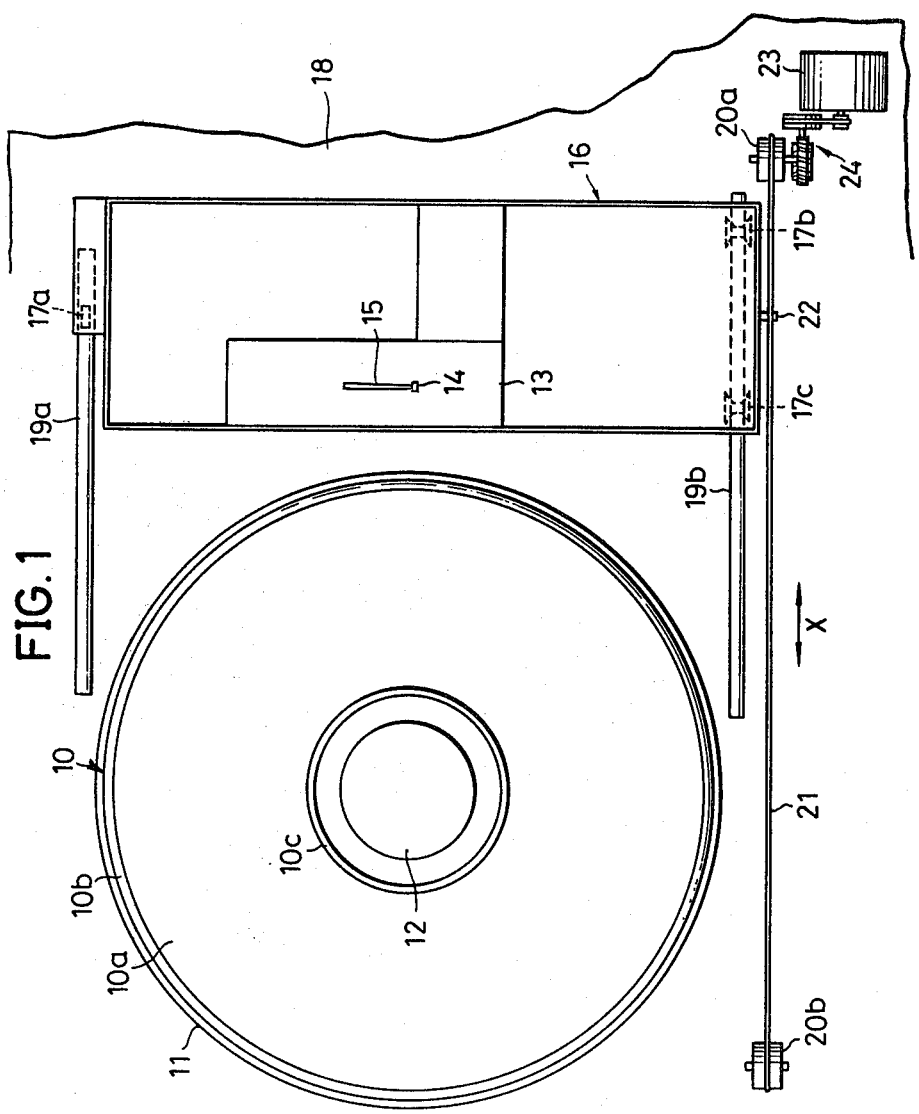
FIG. 1 is a plan view showing an example of a rotary recording medium reproducing apparatus which can be applied with a high-speed search system according to the present invention.

In FIG. 1, a disc 10 is placed on a turntable 11, and clamped by a clamper 12. The disc 10 is rotated at a rotational speed of 900 rpm, for example. This rotational speed is for the case where the recorded video signal is of the NTSC system. In the case where the recorded video sigal is of the PAL system or the SECAM system, the rotational speed is 750 rpm. Further, groove guards 10b and 10c are respectively provided at an outermost peripheral edge part and an innermost peripheral part of the disc 10, so that a recorded region 10a of the disc 10 does not make contact with the turntable 11. An information signal such as a video signal and an audio signal and reference signals for tracking control, are recorded in the recorded region 10a of the disc 10.

A reproducing transducer 13 comprises a pickup device including a cantilever 15 provided with a reproducing stylus 14, a resonator (not shown), and the like, and is mounted to a carriage 16. The carriage 16 has flange parts provided unitarily at both sides thereof, and the flanges have freely rotatable rollers 17a, 17b, and 17c. The roller 17a rolls over a rail 19a provided on a chassis 18 of the reproducing apparatus, and the rollers 17b and 17c respectively roll over a rail 19b. Accordingly, the carriage 16 moves in the direction of an arrow X.

A belt or a wire 21 is provided across pulleys 20a and 20b. A projection 22 of the carriage 16 is fixedly provided at a part of the wire 21. The rotation of a motor 23 is transmitted to the pulley 20a through a rotation transmitting mechanism 24 including a worm and a worm gear. Accordingly, the pulley 20a rotates as the motor 23 rotates, and the wire 21 is accordingly transferred towards the direction of the arrow X. Hence, the carriage 16 is also transferred toward the direction of the arrow X.

Figure 2:
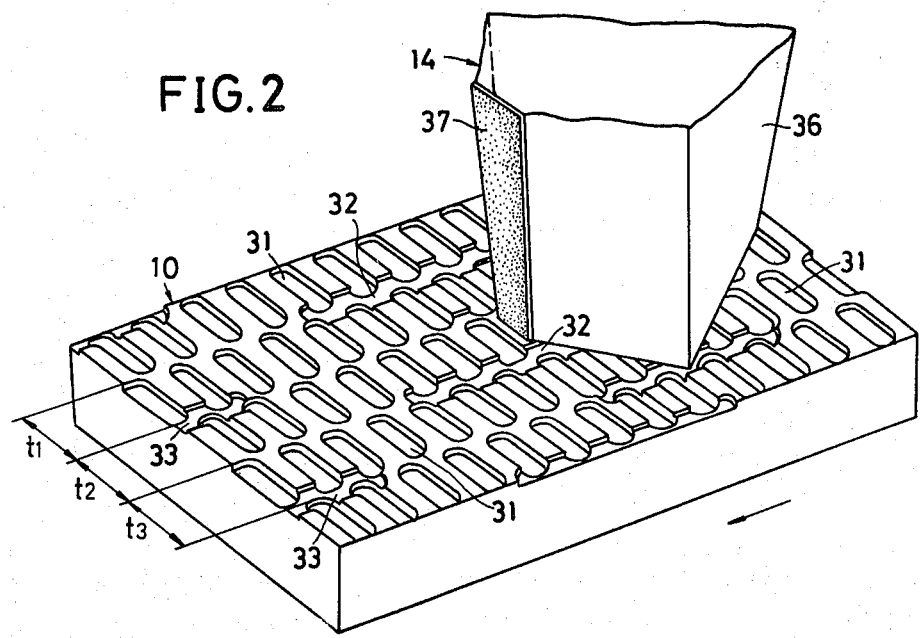
FIG. 2 is a perspective view showing a part of a rotary recording medium in an enlarged state together with a tip end part of a reproducing stylus.
Figure 3:
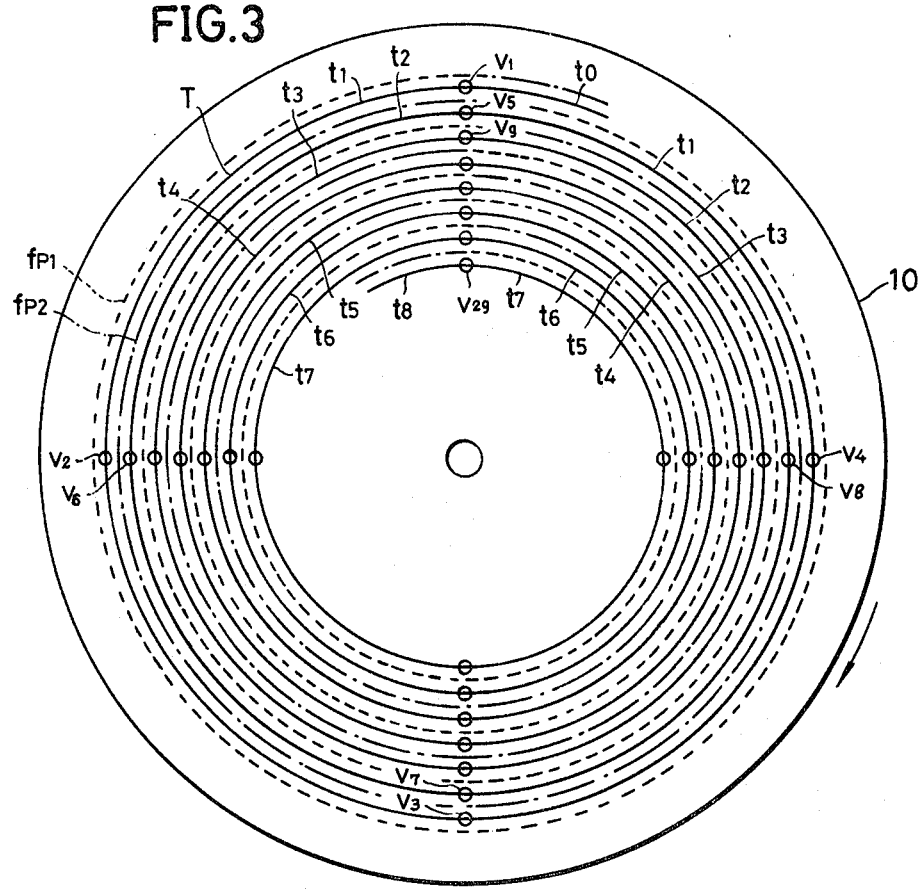
FIG. 3 is a diagram for explaining the recorded state of reference signals on a track pattern on a rotary recording medium.

A video signal is recorded on a spiral track with pits formed on the disc 10 responsive to the information contents of the signal. In FIGS. 2 and 3, track turns of a single continuous spiral track, corresponding to each revolution of the disc 10, are designated by $t_1$, $t_2$, $t_3$. . . . Each track turn is constituted by the formation of pits 31 of the main information signal along the plane track path and has no stylus guide groove formed therein. With respect to one track turn $t_1$, in every horizontal scanning period (H) at a position corresponding to the horizontal blanking period, pits 32 of a first reference signal fp1 are formed on one lateral side of the track as viewed in the track path direction. Pits 33 of a second reference signal fp2 are formed on the other side of the track.

At an intermediate position between center lines of adjacent track turns, only pits of either one kind of the pits 32 and 33 of the above reference signals fp1 and fp2 are formed, and with respect to one track, moreover, the sides on which the pits 32 and 33 are formed are changed over for every track turn. That is, if pits 32 and 33 are respectively formed on the right and left sides of one track turn, for example, pits 33 and 32 are respectively formed on the right and left sides of each of the adjacent track turns.

As indicated in FIG. 3, a video signal is recorded along a spiral track T of the disc 10 for two frames, that is, four fields, per one revolution of the disc. In FIG. 3, the tracks of the reference signal fp1 is shown by dotted lines while the tracks of the reference signal fp2 is shown by one-dot chain lines. The positions of the vertical synchronizing signals of respective fields are designated by reference characters $V_1$, $V_2$, $V_3$, . . . , and the successive track parts corresponding to one revolution of the disc of a single spiral track T are respectively designated by track turns $t_1$, $t_2$, $t_3$, . . . . Furthermore, a third reference signal fp3 is recorded at the starting end positions $V_1$, $V_5$, $V_9$, . . . of each track turns $t_1$, $t_2$, $t_3$, . . . , that is, at positions where the reference signals fp1 and fp2 change over.

The tip end of the reproducing stylus 14 has a shape shown in FIG. 1. The reproducing stylus 14 consists of a stylus structure 36 having a disc tracing surface which has a width greater than a track width, and an electrode 37 fixed to the rear face of the stylus structure 36. As the reproducing stylus 14 traces along a track on the disc 10 which is rotating in a direction indicated by an arrow, the video signal recorded thereon by the formation of pits is reproduced as variations in the electrostatic capacitance between the surface of the disc 10 and the electrode 37 of the reproducing stylus 14.

Figure 4:
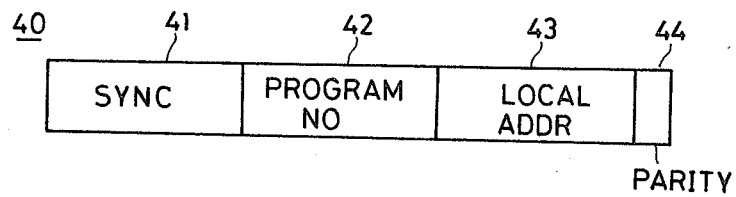
FIG. 4 is a diagram for explaining a chapter address signal.

A chapter address signal 40 shown in FIG. 4 is recorded at vertical synchronizing signal positions $V_1$, $V_2$, $V_3$, . . . , on the disc 10. This chaper address signal 40 comprises a synchronizing bit 41, a program number bit 42, a local address bit 43 for indicating a time position within a program number, and a parity bit 44. A program number described by the program bit 42 of the above chapter address signal is the same number within the same program.

Figure 5:
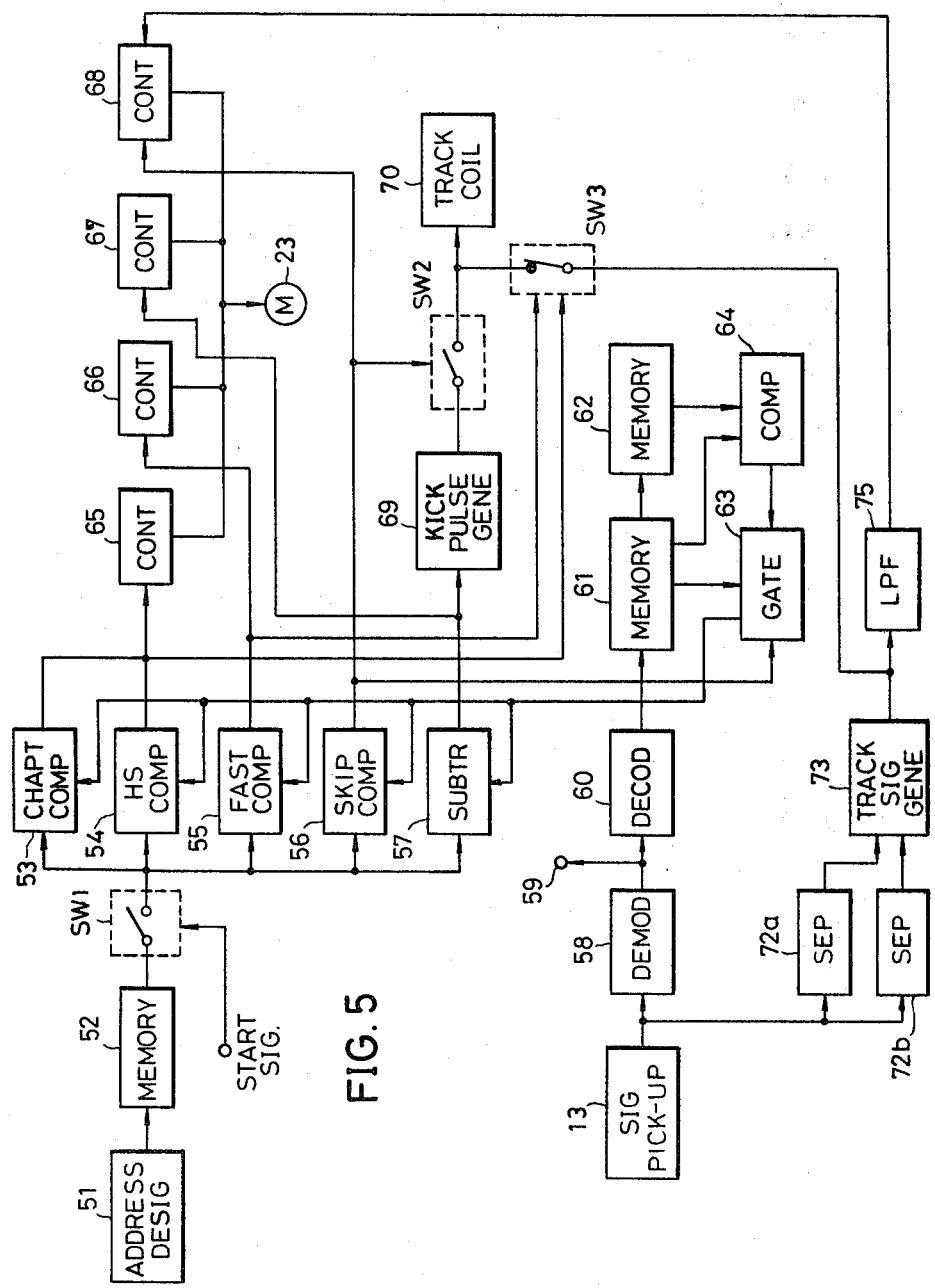
FIG. 5 is a functional systematic block diagram showing an embodiment of a high-speed search system according to the present invention.

One embodiment of a high-speed search system, according to the present invention, applied to the above described rotary recording medium reproducing apparatus, will now be described in conjunction with FIG. 5. For convenience of description, the functions of this system of the invention are represented by the block system in FIG. 5. In an actual apparatus, the functions of the plurality of blocks are consolidated in a microcomputer.

First, for causing the signal pickup device 13 to move to a desired track position, the reproduction of which is desired, the program number and the local address of the desired position is designated by manipulating a key of an address designation keyboard 51. The address thus designated is stored by a memory 52.

When a switch SW1 is closed in response to a high speed- search starting signal, the designated address signal from the memory 52 is supplied to a chapter comparator 53, a comparator 54 for controlling high-speed forward/high-speed backward searching, a comparator 55 for controlling fast forward/fast backward searching, a comparator 56 for controlling kicking, and a subtractor 57.

The turntable 11 together with the disc 10 mounted thereon is caused to rotate by the above mentioned starting signal. The signal of the track on the disc 10 over which the reproducing stylus 14 is positioned is reproduced by the signal pickup device 13. The signal thus reproduced is demodulated by a demodulator 58. The resulting demodulated video signal is led out through a terminal 59, and, at the same time, an address signal is decoded by an address decoder 60. The address signal thus decoded is stored in a memory 61 and, at the same time, is supplied to a gate 63 and a comparator 64. The memory 61 operates to store the address signal as an input and, when a succeeding address signal enters thereinto, transmits the first signal thus stored to a succeeding memory 62, at the same time storing the newly arrived second signal. The comparator 64 compares the signals from the memories 61 and 62 and, in response to the resulting comparison output thereof, controls the gate 63.

At the time of starting, the gate 63 is open, and the address signal from the address decoder 60 is supplied by way of the memory 61 and the gate 63 to the comparators 53 through 56 and the subtractor 57. The comparators 53 through 56 have respectively different threshold values. For example, these threshold values are selected so that, when the difference between the designated address signal and the reproduced address signal is ±3,000 or more in the comparator 54 for controlling high-speed forward/high-speed backward searching, from ±3,000 to ±100 in the comparator 55 for controlling fast forward/fast backward searching, and within ±100 in the comparator 56 for controlling kicking, these comparators will respectively operate and produce outputs. Moreover, the comparator 53 produces an output when the designated address number and the program number of the reproduced address signal differ.

In a case where the program number of the recorded information signal at the position where the reproducing stylus 14 of the signal pickup device 13 makes contact with the disc 10 upon starting of the high-speed search differs from the designated program number, a signal having a polarity according to whether the position of the designated program number is towards the outer peripheral side or the inner peripheral side along the radial direction of the disc 10 with respect to the position of the reproducing stylus 14 is obtained from the above comparator 53. This signal from the comparator 53 is supplied to a motor control circuit 65 for controlling high-speed forward/high-speed backward searching.

On the other hand, in a case where the position of the reproducing stylus 14 is within the same program number range as the designated program number, and further, when the position of the reproducing stylus 14 and the position of the designated local address is separated by more than 3,840 track turns in terms of numbers of tracks, for example, a signal having a polarity according to the separated direction along the radial direction of the disc 10 is produced from the comparator 54 for controlling the high-speed forward/high-speed backward searching. The above signal produced from the comparator 54 is supplied to the motor control circuit 65 for controlling high-speed forward/high-speed backward searching.

The motor 23 is controlled by the motor control circuit 65 to rotate at a high speed in a direction so as to move the signal pickup device 13 in a direction for approaching the program position or the designated local address position of the disignated program number. Accordingly, the signal pickup device 13 is transferred at a high speed of 11,250 track turns per second (that is, 750 track turns per one revolution period of the disc), for example, together with the carriage 16.

During the above high-speed transfer operation, a switch SW3 is maintained in an open state by the outputs of the comparators 53 and 54, so that a tracking control signal is not supplied to a tracking coil 70 which will be described hereinafter.

A chapter address signal is inserted in one H (one horizontal scanning period) within the vertical blanking period and is recorded at four positions with respect to one revolution of the disc 10. Two frames of the video signal are recorded on one track turn of the disc 10. For this reason, if there are 525 horizontal scanning lines per frame, address signals corresponding to 1,050 H per track turn are recorded. Accordingly, the ratio of address signals in each track turn is 4/1,050. Therefore, even if the reproducing stylus 14 traverses 1,050 tracks during one revolution of the disc 10, i.e., in 1/15 second, four addresses will be reproduced on the basis of probability. The signal pickup device moving speed or the track traversing speed in this case is 15,750 track turns/second. Therefore, even if the reproducing stylus 14 traverses the track turns at a high speed of 11,250 track turns/second, chapter address signals can be amply reproduced.

When the signal pickup device 13 is transferred at the above described high speed and the reproducing stylus 14 enters within the above designated program number, and further, in a case where the interval between the beginning of the above program and the position of the designated local address is under 3,840 track turns, no outputs are produced from the comparators 53 and 54. Accordingly, an output is produced from the comparator 55 for controlling fast forward/fast backward searching. This output of the comparator 55 is supplied to a motor control circuit 66 for controlling fast forward/fast backward searching. At this time, the motor 23 is driven in rotation by the motor control circuit 66. As a result, the signal pickup device 13 is transferred at a fast-speed of, for example, 1,800 track turns per second.

Even at the time of this fast transferring operation, the switch SW3 remains open as a result of the output of the comparator 55, and tracking servo is not applied.

When the signal pickup device 13 thus undergoes a fast transferring movement, and the difference between its position and the designated local address position becomes less than 250 track turns, the output from the comparator 55 disappears. An output is produced from the comparator 56 for controlling kicking. As a consequence of the disappearance of the output from the comparator 55, the switch SW3 is closed.

The output of the comparator 56 is supplied to a motor control circuit 68 for controlling kicking. The voltage applied to the motor 23 reaches a value such that there is substantially no rotation of the motor. Consequently, the carriage 16 is virtually stopped. Furthermore, the output of the comparator 56 is supplied to close a switch SW2. In addition, the output of the comparator 56 is applied to the gate 63, which is closed so that it will open only in response to a signal from the comparator 64.

The subtractor 57 carries out subtraction of the reproduced address signal. A designated address is supplied prior to the closing of the gate 63 and produces a signal corresponding to the difference between the track turns. This signal from the subtractor 57 is supplied to a kick pulse generator 69, which generates kick pulses of, for example, 4 μsec periods, and of a pulse number corresponding to the difference between the track turns. These kick pulses consists of a positive polarity pulse and a negative polarity pulse respectively having a pulse width of 150 μsec, for example, as shown in FIG. 7. The above kick pulses are supplied through the switch SW2, which has been closed as described above, to the tracking coil 70 (70a through 70d in FIG. 6). As a consequence, the cantilever 15 is kicked, and the reproducing stylus 31 traverses in response to the kick pulses toward the track having the designated address one track at a time for every pulse. During this operation, the carriage 16 remains virtually stopped, and the reproducing stylus 14 undergoes a displacement as a result of the displacement of the cantilever 15 driven by the coils 70a through 70d.

Figure 6:
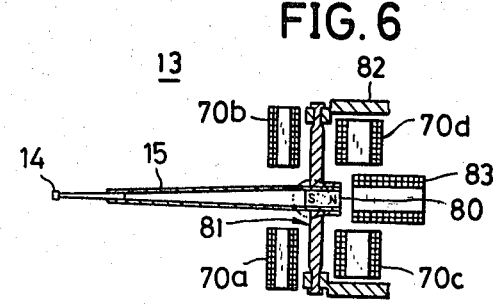
FIG. 6 is a plan view in cross section showing an example of a signal pickup device.
Figure 7:
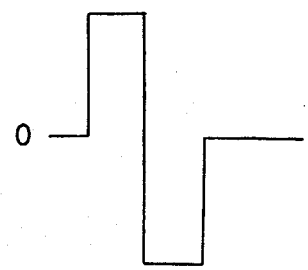
FIG. 7 is a diagram showing the waveform of a kick pulse.

As shown in FIG. 6, in the signal pickup device 13, a permanent magnet 80 is fitted into the rear end of the cantilever 15 provided with the reproducing stylus 14 at the tip end thereof. The rear end part of the above cantilever 15 is supported by a resilient support member 81 made of rubber, at the center portion of the rear end part. Moreover, end parts on both arms of the support member 81 are supported by a pickup cartridge frame 82. The above tracking coils 70a through 70d are provided at both sides on the front and rear at positions in the vicinity of the rear end part of the cantilever 15. Further, a jitter compensation coil 83 is provided directly behind the cantilever 15.

The signal reproduced by the signal pickup device 13 is supplied to pilot signal separation circuits 72a and 72b, where first and second pilot signals fp1 and fp2 are separated. These separated pilot signals are supplied to a control signal generating circuit 73, in which a tracking control signal responsive to the difference in the levels of the two pilot signals is generated as output. This tracking control signal is supplied through the closed switch SW3 to the coil 70. Tracking control is effected so that the reproducing stylus 14 will track accurately along the centers of the track turns. The tracking control signal is further supplied by way of a low-pass filter 75 to the control circuit 68. If the cantilever 15 has been displaced excessively from the neutral position to an extent where tracking control is not possible as a result of the kicking operation of the cantilever 15 and the reproducing stylus 14, the motor 23 rotates very slightly to cause the carriage 16 to undergo a very small displacement and thereby to place the cantilever 15 substantially in the neutral position.

The above described operation is actually performed by a micro-computer. Hence, description will now be given with respect to an example of an operation in which the beginning position of the program of the designated program number is searched for with a high speed. A discrimination device within the micro-computer compares the designated program number and the program number of the detected chapter address. When the discrimination device judges that the desired recorded program under search is recorded towards the inner peripheral side of the disc from the position of the reproducing stylus as a result of the above comparing operation, the signal pickup device 13 is transferred towards the inner peripheral direction of the disc as described above with a high speed of 750 tracks turns per second for one revolution of the disc (at a speed which is 750 times the normal speed), until a chapter address signal having a target program number is detected by the reproducing stylus.

When the reproducing stylus reaches a position to reproduce the program of the designated number, the above discrimination device detects whether the upper four bits of the local address within the reproduced chapter address signal are all "0". In a case where not all the bits are "0", this indicates that the reproducing stylus has overrun by a large amount to a track position where it takes more than $2^8$ seconds to reach from the beginning position of the designated program upon normal reproduction (that is, to a position separated by more than 3,840 tracks from the beginning position of the target chapter, since fifteen tracks are recorded in the disc for one second during normal reproduction). Therefore, the signal pickup device is then transferred towards the outer peripheral direction of the disc at a high speed which is 750 times that upon normal reproduction.

However, in the present case, the chapter address signal is detected for every ¼ revolution of the disc. Normally, the signal pickup device does not overrun the beginning position of the designated program by more than ¼ revolution of the disc, that is, by more than 300 tracks. Accordingly, the upper four bits of the local address are all "0".

On the other hand, when all the upper four bits are "0" or all the upper four bits become zero, the above discrimination device transfers the reproducing stylus towards the outer peripheral direction of the disc at a speed which is 120 times that upon normal reproduction, for example, so that the reproducing stylus reproduces 120 track turns per one revolution period of the disc.

When the reproducing stylus is transferred at the above speed which is 120 times that upon normal reproduction towards the outer peripheral direction of the disc to approach the beginning position of the designated program, and the upper eight bits of the local address within the reproduced chapter address signal all become "0", the above discrimination device then produces a kick pulse a total of sixty-four times during one revolution period of the disc, for example. The above kick pulse is used for forcibly transferring the reproducing stylus towards the outer peripheral direction of the disc by one track pitch. Moreover, the transferring speed of the carriage during this operation is the same as that upon normal reproduction.

Accordingly, when all the upper eight bits become "0", and the reproducing stylus reaches a position within sixteen seconds from the beginning position of the designated program (that is, a track position towards the inner peripheral side of the disc within 240 tracks from the beginning position of the designated program), a 63-times speed reproduction in the backward direction is performed. Moreover, in this case, the above kick pulse is generated a number of times which is fifteen times the value of the lower four bits of the local address (a value converted into a decimal value). That is, the above value of the lower four bits of the local address indicates the reproducing interval from the beginning position of the designated program to the present position of the reproducing stylus in seconds. When the above value is multiplied by fifteen, the corresponding number of tracks from the beginning position of the designated program to the present position of the reproducing stylus is obtained. Hence, by generating the kick pulse a number of times equal to the number obtained by multiplying the above value by fifteen, the reproducing stylus reaches a position within fifteen tracks from the beginning position of the designated program.

The above number of kick pulses which are to be generated, obtained by mutliplying the value of the lower four bits of the local address within the detected chapter address signal, is calculated within the period of the negative polarity pulse of the above kick pulse.

The reproducing stylus thus reaches a position within fifteen tracks from the beginning position of the designated program. However, by considering the differences in the number of tracks which are reproduced during one second between the NTSC system and other television systems (PAL system, SECAM system), a confirming operation is performed by stopping the transfer of the reproducing stylus and generating kick pulses for kicking the reproducing stylus once towards the outer peripheral direction of the disc with one revolution period of the disc, to perform a still reproduction.

Therefore, a search can be performed at a high speed to obtain the beginning position of the designated program or a position within fifteen tracks from the above beginning position.

Next, description will be given for a case where the search operation is to be performed when the designated program is recorded towards the outer peripheral side of the disc from the position of the reproducing stylus. In this case, the reproducing stylus is transferred toward the outer peripheral direcion of the disc. However, the position on the disc towards the outer peripheral side of the disc following the state in which all the twelve bits of the local address within the detected chapter address signal become "0", corresponds to the final recorded part of the preceding chapter. Accordingly, the position of the program recorded before the program being reproduced at that moment, can be known by observing the local address. Hence, when searching for the designated program positioned towards the outer peripheral side of the disc from the position of the reproducing stylus, the discrimination device judges whether the program number within the chapter address signal coincides with that of the designated program. In a case where the above program numbers do not coincide, the reproducing stylus is transferred at a speed which is 750 times that upon normal reproduction while performing reproduction, towards the outer peripheral side of the disc. On the other hand, when the above program numbers coincide or coincidence is obtained, an operation similar to that performed when search is performed with respect to the designated program positioned towards the inner peripheral side of the disc from the position of the reproducing stylus, by observing the local address.

Further, this invention is not limited to these embodiments but various variations and modifications may be made without departing from the scope of the invention.

What is claimed is:

1. A high-speed search system for an apparatus having a reproducing transducer, including a reproducing element for reproducing recorded signals from a rotary recording medium, and transferring means, including a motor, for transferring said reproducing transducer along a radial direction of said rotary recording medium, said rotary recording medium being recorded with an information signal and a chapter address signal on a spiral track thereof, said information signal recorded on said rotary recording medium being divided into a plurality of programs identified by program numbers on said rotary recording medium, said chapter address signal indicating a position on said rotary recording medium, said chapter address including at least a synchronizing bit part, a program number bit part, and a local address bit part, said program number bit part indicating a program number of a program and assuming the same value within the same program, said local address bit part indicating a position within a program identified by said program number bit part, said chapter address signal assuming a value successively increasing or decreasing towards an inner periphery from an outer periphery of said rotary recording medium, said high-speed search system comprising:

designating means for designating a chapter address of a desired program which is to be reproduced;
a memory for storing the chapter address designated by said designating means;
address decoder means for decoding a chapter address from a signal reproduced by said reproducing transducer;
a first comparator for comparing the designated chapter address read out from said memory and the chapter address decoded by said address decoder means, and for producing an output signal indicative of whether the present position of said reproducing element is towards the inner or outer periphery of said rotary recording medium with respect to the designated chapter address;
a second comparator for producing an output signal when a difference between the designated chapter address and the decoded chapter address is within a first range;
a third comparator for producing an output signal when the difference between the designated chapter address and the decoded chapter address is within a second range, said second range being lower than said first range;
a fourth comparator for producing an output signal when the difference between the designated chapter address and the decoded chapter address is with in a third range, said third range being lower than said second range;
first control means, responsive to the output signals of said first and second comparators, for driving said motor to move said reproducing transducer at a first high speed in a direction determined by the output of said first comparator;
second control means, responsive to the output signals of said first and third comparators, for driving said motor to move said reproducing transducer at a second high speed in a direction determined by said first comparator, said second high speed being lower than said first high speed;
kick pulse generating means for generating kick pulses according to the difference between the designated chapter address and the decoded chapter address;
kick means for receiving said kick pulses and responsively kicking said reproducing element toward an adjacent track; and
third control means, responsive to the output signals of said first and fourth comparators, for substantially stopping rotation of said motor and enabling said kick means to kick said reproducing element to an adjacent track in a direction determined by the output of said first comparator,
each of said first, second, third, and fourth comparators comparing only said program number bit parts and first upper bit portions of said local address bit parts of said designated and decoded chapter addresses while said reproducing transducer is being transferred at said first high speed, and comparing only said upper bit portions and second upper bit portions of said local address bit parts of said designated and decoded chapter addresses while said reproducing transducer is being transferred at said second high speed,
the transfer of said reproducing transducer and kicking of said reproducing element being stopped when lower bit portions of said local address bit parts of said chapter addresses coincide.

2. A high-speed search system as claimed in claim 1 in which the transfer of said reproducing transducer at said first high speed is continued until said program bit parts and said first upper bit portions of said local address bit parts of said designated and decoded chapter addresses respectively coincide, the transfer of said reproducing transducer at said second high speed is continued until said second upper bit portions of said local address bit parts of said designated and decoded chapter addresses coincide, and said kick means successively kicks said reproducing element toward adjacent tracks until said lower bit portions of said local address bit parts of said designated and decoded chapter addresses coincide, said kick means delivering a number of kicks to said reproducing element which is determined by a difference in values of said lower bit portions of said local address bit parts of said designated and decoded chapter addresses.

3. A high-speed search system as claimed in claim 1 wherein each program defines a beginning and said rotary recording medium includes tracks and wherein a track within a predetermined range from said beginning of said desired program is accessable upon completion of the high-speed search operation, and wherein both said track which is accessable upon completion of the high-speed search operation and said tracks within said predetermined range are all designated by chapter addresses in which the lower bit portions of said local address bit parts thereof are the same.

4. A high-speed search system as claimed in claim 5 in which said chapter address designated by said designating means indicates a beginning of said desired program.

* * * * *

UNITED STATES PATENT AND TRADEMARK OFFICE
CERTIFICATE OF CORRECTION

PATENT NO. : 4,428,074

DATED : January 24, 1984

INVENTOR(S) : RYOZO ABE, ET AL.

It is certified that error appears in the above-identified patent and that said Letters Patent is hereby corrected as shown below:

Column 12, Claim 4, line 12, change "5" to --1--.

Signed and Sealed this

Second Day of October 1984

[SEAL]

Attest:

Attesting Officer

GERALD J. MOSSINGHOFF

Commissioner of Patents and Trademarks